(12) United States Patent
Huang et al.

(10) Patent No.: US 12,405,774 B2
(45) Date of Patent: Sep. 2, 2025

(54) CREATING USER INTERFACE USING MACHINE LEARNING

(71) Applicant: Google LLC, Mountain View, CA (US)

(72) Inventors: Zifeng Huang, Emeryville, CA (US); Yang Li, Palo Alto, CA (US); Xin Zhou, Mountain View, CA (US); Gang Li, Mountain View, CA (US); John Francis Canny, Berkeley, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/348,191

(22) Filed: Jul. 6, 2023

(65) Prior Publication Data

US 2023/0350651 A1 Nov. 2, 2023

Related U.S. Application Data

(63) Continuation of application No. 18/046,428, filed on Oct. 13, 2022, now Pat. No. 11,740,879.

(60) Provisional application No. 63/255,366, filed on Oct. 13, 2021.

(51) Int. Cl.
G06N 3/00 (2023.01)
G06F 3/0484 (2022.01)
G06F 8/33 (2018.01)
G06F 8/38 (2018.01)
G06F 40/40 (2020.01)
G06N 3/0455 (2023.01)

(52) U.S. Cl.
CPC .............. *G06F 8/38* (2013.01); *G06F 3/0484* (2013.01); *G06F 8/33* (2013.01); *G06F 40/40* (2020.01); *G06N 3/0455* (2023.01)

(58) Field of Classification Search
CPC . G06F 8/38; G06F 3/0484; G06F 8/33; G06F 40/40; G06F 8/34; G06F 40/279; G06F 40/143; G06N 3/0455; G06N 3/047; G06N 3/0475; G06N 3/088
See application file for complete search history.

(56) References Cited

U.S. PATENT DOCUMENTS

| | | | |
|---|---|---|---|
| 2017/0011279 A1* | 1/2017 | Soldevila | G06V 30/226 |
| 2020/0193306 A1 | 6/2020 | Defiebre | |
| 2020/0401716 A1* | 12/2020 | Yan | G06N 3/02 |
| 2021/0397942 A1* | 12/2021 | Collomosse | G06F 16/583 |
| 2022/0222046 A1 | 7/2022 | Schoppe et al. | |
| 2023/0031702 A1 | 2/2023 | Li | |
| 2023/0115185 A1 | 4/2023 | Huang et al. | |

OTHER PUBLICATIONS

Li, Toby Jia-Jun, et al. "Screen2vec: Semantic embedding of gui screens and gui components." Proceedings of the 2021 CHI Conference on Human Factors in Computing Systems. 2021 (Year: 2021).*

(Continued)

*Primary Examiner* — Andrew T McIntosh
(74) *Attorney, Agent, or Firm* — Fish & Richardson P.C.

(57) ABSTRACT

Methods, systems, and apparatus, including computer programs encoded on a computer storage medium, for training and using machine learning models to generate graphical user interfaces from textual descriptions.

12 Claims, 5 Drawing Sheets

(56) References Cited

OTHER PUBLICATIONS

Juárez-Ramírez, Reyes, Carlos Huertas, and Sergio Inzunza. "Automated generation of user-interface prototypes based on controlled natural language description." 2014 IEEE 38th International Computer Software and Applications Conference Workshops. IEEE, 2014 (Year: 2014).*

Kolthoff, Kristian. "Automatic generation of graphical user interface prototypes from unrestricted natural language requirements." 2019 34th IEEE/ACM International Conference on Automated Software Engineering (ASE). IEEE, 2019 (Year: 2019).*

Kolthoff, "Automatic generation of graphical user interface prototypes from unrestricted natural language requirements." 2019 34th IEEE/ACM International Conference on Automated Software Engineering (ASE). IEEE, 2019, 1234-1237.

Ellawela et al., "A Review about Voice and UI Design Driven Approaches to Identify UI Elements and Generate UI Designs." 2021 International Conference on Intelligent Technologies (CONIT), IEEE, Jun. 25-27, 2021, 4 pages.

Biplab et al., "Rico: A mobile app dataset for building data-driven design applications." Proceedings of the 30th annual ACM symposium on user interface software and technology. Oct. 2017, 845-854.

Bishop, Mixture density networks, Feb. 1994, 26 pages.

Brown et al., "Language Models are Few-Shot Learners." CoRR, Submitted on Jul. 2020, arXiv:2005.14165v4, 75 pages.

Devlin et al., "BERT: Pre-training of deep bidirectional transformers for language understanding." CoRR, Submitted on May 2019, arXiv:1810.04805v2, 16 pages.

Diego et al., "Variational Transformer Networks for Layout Generation" In Proceedings of the IEEE/CVF Conference on Computer Vision and Pattern Recognition, 13642-13652.

Goodfellow et al., "Generative Adversarial Nets" CoRR, Submitted on Jun. 2014, arXiv:1406.2661v1, 9 pages.

Gupta et al., "Layout Generation and Completion with Self-attention" CoRR, Submitted on Jun. 2020, arXiv:2006.14615, 17 pages.

Ha et al., "A neural representation of sketch drawings." CoRR, Submitted Apr. 2017, arXiv:1704.03477, 15 pages.

Huang et al., "Scones: towards conversational authoring of sketches." Proceedings of the 25th International Conference on Intelligent User Interfaces, Mar. 2020, 11 pages.

Huang et al., "Swire: Sketch-based user interface retrieval." Proceedings of the 2019 CHI Conference on Human Factors in Computing Systems, May 2019, 10 pages.

Kang et al., "MetaMap: Supporting visual metaphor ideation through multi-dimensional example-based exploration." Proceedings of the 2021 CHI Conference on Human Factors in Computing Systems, May 2021, 15 pages.

Lasecki et al., "Apparition: Crowdsourced user interfaces that come to life as you sketch them." Proceedings of the 33rd Annual ACM Conference on Human Factors in Computing Systems, Apr. 2015, 10 pages.

Lee et al., "Neural design network: Graphic layout generation with constraints." CoRR, Submitted on Jul. 2020, arXiv:1912.09421v2, 16 pages.

Li et al., "A formal machine-learning approach to generating human-machine interfaces from task models." IEEE Transactions on Human-Machine Systems 47.6, May 2017, 822-833.

Li et al., "LayoutGAN: Generating Graphic Layouts with Wireframe Discriminators" CoRR, Submitted on Jan. 2019, arXiv:1901.06767v1, 16 pages.

Li et al., "Screen2vec: Semantic embedding of gui screens and gui components." CoRR, Submitted on Jan. 2021, arXiv:2101.11103v1, 15 pages.

Li et al., "Mapping Natural Language Instructions to Mobile UI Action Sequences." CoRR, Submitted on Jun. 2020, arXiv:2005.03776v2, 13 pages.

Liu et al., "Learning design semantics for mobile apps." Proceedings of the 31st Annual ACM Symposium on User Interface Software and Technology. Oct. 2018, 569-579.

Material.io [online], "Material Design at Google I/O 2021" May 6, 2021, retrieved on May 5, 2023, retrieved from URL <https://material.io/blog/material-google-io21>, 12 pages.

Moran et al., "Machine learning-based prototyping of graphical user interfaces for mobile apps." IEEE Transactions on Software Engineering 46.2, Jun. 2018, 196-221.

Norman, The Design of Everyday Things, Basic Books, Inc., USA, pp. 111.

Pandian et al., "UISketch: a large-scale dataset of UI element sketches." Proceedings of the 2021 CHI Conference on Human Factors in Computing Systems, May 2021, 14 pages.

Parekh et al., "Crisscrossed captions: Extended intramodal and intermodal semantic similarity judgments for MS-COCO." CoRR, Submitted on Mar. 2021, arXiv:2004.15020, 16 pages.

Patil et al., "Read: Recursive autoencoders for document layout generation." Proceedings of the IEEE/CVF Conference on Computer Vision and Pattern Recognition Workshops, 2020, 544-545.

Ramesh et al., "Zero-Shot Text-to-Image Generation" CoRR, Submitted on Feb. 2021, arXiv:2102.12092, 20 pages.

Rathnayake et al., "A framework for adaptive user interface generation based on user behavioural patterns." 2019 Moratuwa Engineering Research Conference (MERCon). IEEE, Jul. 2019, 698-703.

Vaswani et al., "Attention is All You Need" CoRR, Submitted on Dec. 2017, arXiv:1706.03762v5, 15 pages.

Wang et al., "Screen2words: Automatic mobile UI summarization with multimodal learning." CoRR, Submitted on Aug. 2021, arXiv:2108.03353v1, 13 pages.

Xia, "Crosspower: Bridging Graphics and Linguistics" In Proceedings of the 33rd Annual ACM Symposium on User Interface Software and Technology, Virtual Event, USA, Oct. 20-23, 2020, 13 pages.

Zhang et al., "Cross-modal contrastive learning for text-to-image generation." Proceedings of the IEEE/CVF conference on computer vision and pattern recognition, 2021, 833-842.

* cited by examiner

CREATING USER INTERFACE USING MACHINE LEARNING

CROSS-REFERENCE TO RELATED APPLICATIONS

This application is a continuation application of, and claims priority to, U.S. patent application Ser. No. 18/046,428, filed on Oct. 13, 2022, which application claims the benefit under 35 U.S.C. § 119(e) of U.S. Application No. 63/255,366, filed on Oct. 13, 2021. The disclosure of the foregoing applications are incorporated herein by reference in their entirety for all purposes.

TECHNICAL FIELD

This specification is related to machine learning and predicting graphical user interfaces.

BACKGROUND

A graphical user interface (GUI) or simply user interfaces (UI) is an interface through which a user interacts with electronic user devices such as computers, smartphones and tablets. A user interface displays graphical elements such as icons, menus or other indicators to convey information to and facilitate interaction by the user with the user device. The design process of UIs often begins with articulating high-level design goals. Translating these high-level design goals into concrete design mock-ups, however, requires extensive effort and UI design expertise.

Machine learning is a type of artificial intelligence that aims to teach computers how to learn and act without necessarily being explicitly programmed. More specifically, machine learning is an approach to data analysis that involves building and adapting models, which allow computer executable programs to "learn" through training. Machine learning involves design of algorithms that adapt their models to improve their ability to make predictions. The computer may identify rules or relationships during the training period and learn the learning parameters of the machine learning model. Then, using new inputs, the machine learning model can generate a prediction based on the learned rules or relationships. Machine learning can be applied to a variety of areas such as search engines, medical diagnosis, natural language modelling, autonomous driving etc.

SUMMARY

To facilitate this process for UI developers, the systems and methods described below utilize deep-learning techniques to create UI mock-ups from a natural language phrases that describe the high-level design goal (e.g. "pop up displaying an image and other options").

In general, one innovative aspect of the subject matter described in this specification can be embodied in methods including the operations of receiving a training dataset comprising a plurality of training samples, each training sample comprising: a graphical user interface that includes a plurality of graphical elements, and a natural language textual description of the graphical user interface; generating, for each graphical user interface, graphical attribute data that describes, for each graphical element of the graphical user interface, an attribute type of the graphical element, and a position of the graphical element; generating, for each natural language textual description, using a pre-trained word embedding model, an embedding vector of the natural language textual description; and training a machine learning model, based on the graphical attribute data and the embedding vector for each training sample, to generate, as output, prediction data that is indicative of graphical elements in a graphical user interface. Other embodiments of this aspect include corresponding systems, apparatus, and computer programs, configured to perform the actions of the methods, encoded on computer storage devices.

In other aspects, the prediction data comprises, for each of a plurality of graphical elements, a probability distribution of the graphical element being included in a graphical user interface, and a probability distribution of the positon of the graphical element in the graphical user interface.

In other aspects, the prediction data comprises, a plurality of graphical elements, and for each of the graphical elements, a positon of the graphical element in the graphical user interface.

In other aspects, the machine learning model comprises a transformer based model that includes an encoder that processes the embedding vector of the natural language textual description, and a decoder that processes the graphical attribute data.

In other aspect, the method includes providing a natural language textual description of a graphical user interface as input to the machine learned model; generating, by the machine learned model, based on the natural language textual description of graphical user interface prediction data that is indicative of graphical elements in a graphical user interface; providing the prediction data to a graphical user interface renderer; and generating, by the renderer, a graphical user interface based on the prediction data.

Another innovative aspect of the subject matter described in this specification can be embodied in methods including: receiving a training dataset comprising a plurality of training samples, each training sample comprising: a graphical user interface that includes a plurality of graphical elements; and a natural language textual description of the graphical user interface; generating, for each graphical user interface, graphical attribute data that describes, for each graphical element of the graphical user interface, an attribute type of the graphical element, and a position of the graphical element; generating, for each natural language textual description, using a pre-trained word embedding model, an encoded representation of the natural language textual description; training a machine learning model comprising: a first encoder model that is configured to receive as input, the graphical attribute data and generate as output, a first embedding vector, a second encoder model that is configured to receive as input, the encoded representation of the natural language textual description and generate as output, a second embedding vector; generating embedding pairs, each embedding pair being a first embedding vector paired with a second embedding vector, wherein the first embedding vector and the second embedding vector for the embedding pair are the first embedding vector and the second embedding vector generated from a training sample; adjusting a plurality of parameters of the first encoder model and the second encoder model of the machine learning model based on a loss function that computes an error based on the first embedding vectors and the second embedding vectors. Other embodiments of this aspect include corresponding systems, apparatus, and computer programs, configured to perform the actions of the methods, encoded on computer storage devices.

In other aspects, adjusting the plurality of parameters of the machine learning model based on the loss function that computes an error based on the first embedding vectors and the second embedding vectors comprises: selecting K embedding pairs of embeddings; and based on the embedding pairs, minimizing a distance between the first embedding vector and the second embedding vector of each pair, and maximizing a distance between the pairs of first embedding vectors and second embedding vectors of different embedding pairs in the K pairs.

In other aspects, the method includes selecting K embedding pairs of embeddings comprises selecting a proper subset of embedding pairs; and iteratively selecting the K embedding pairs and iteratively minimizing the distance between the first embedding vector and the second embedding vector of each pair, and maximizing the distance between the pairs of first embedding vectors and second embedding vectors of different embedding pairs, wherein the iteratively selecting comprises selecting different proper subsets of K embedding pairs.

In other aspects, the loss function is based, in part, on a dot product between each first embedding vector and each second embedding vector.

In other aspects, the method includes generating an encoded representation of a natural language textual description of a graphical user interface; providing the encoded representation as input to the machine learning model; generating, by the machine learning model, and based on the encoded representation of a natural language textual description of graphical user interface, a second embedding vector; and selecting one or more training graphical user interfaces from a dataset based on the second embedding vector.

In other aspects, selecting one or more training samples from the training dataset comprises: for each training sample among the plurality of samples of the training dataset: generating, for each graphical user interface, graphical attribute data, providing the graphical attribute data to the first encoder model to generate a first embedding vector, determining the difference between the second embedding vector and the first embedding vector; and selecting one or more graphical user interfaces based on the difference between the second embedding vector and the plurality of first embedding vectors where each of the first embedding vector corresponds to a graphical user interface in a dataset.

In other aspects, selecting one or more training samples comprises selecting those training samples that have the lowest difference between the second embedding vector and the first embedding vector.

Particular embodiments of the subject matter described in this specification can be implemented so as to realize one or more of the following advantages. Conventional approaches to GUI development generally involve application developers and professional designers dedicating extensive time, effort and resources in creating multiple prototypes. Each prototype then requires user feedback, before a prototype GUI that meets all requirements is finalized and developed. This makes the conventional approaches of GUI development time and resource consuming. In contrast, the techniques and methods described in this document provide an automated process of GUI development using machine learning models. The machine learning models use state-of-the art embedding techniques and training process so as to learn the complex relationships between a GUI and a textual description of the GUI. Using the learned relationships, the machine learning models can be queried using a textual description and the machine learning model can generate or select a GUI that is contextually related to the textual description. This automation saves both time and resources when compared the existing techniques of GUI development. As such, the processes can lead to GUIs which mediate the interaction between the user and device in a more efficient and responsive manner than would otherwise be achieved, particularly for a given expenditure of time and resource.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Overview

Development of GUI for webpages, applications and operating systems generally includes graphical elements such as labels, buttons check boxes, sliders, etc., that are combined together to form complex layouts in a variety of styles, animations and transitions that may require coordination between a number of users and developers. Conventional approaches to GUI development generally involve application developers and professional designers dedicating extensive time, effort and resources in creating multiple prototypes. Each prototype then requires user feedback, before a prototype GUI that meets all requirements is finalized and developed.

Since generating the GUI prototypes is a time consuming process and requires specific skillset, it is desirable to provide an automated process to achieve the same aims. This specification discloses methods, systems, apparatus, and computer readable media that generates GUI prototypes using machine learning models. The machine learning models can process textual descriptions describing GUIs and in turn generates GUI prototypes based on the textual descriptions.

To train such machine learning models, the techniques and methods described in this specification use a training dataset that includes multiple training samples where each training sample includes an image of a GUI and a corresponding natural language textual description (or simply textual description) that describes the GUI. For example, if a training sample depicts a login screen with graphical elements such as two textboxes and a submit button where the first textbox is for providing username and the second textbox is for providing password, the textual description can include "a login screen" or "a login screen with two textboxes and a button." In some implementations, each training sample can also include a structural representation of the graphical elements of the sample GUI. For example, each training sample can also include a JSON file where each node corresponding to a graphical element contains various properties of the graphical element such as class, visibility to the user and the bounds of the element.

The machine learning models described in this document, once trained, can generate GUIs based on a textual description provided by the user of the system. For example, instead of generating GUIs using conventional approaches, the machine learning models can be provided as input a textual description that describes a GUI or describes the purpose of the GUI. For example, if the user of the system wants to generate a login page, the user can provide a textual description such as "login page" as input to the trained machine learning models and the machine learning models can generate a GUI that show a login page. These features and additional features are described in more detail below.

Figure 1:
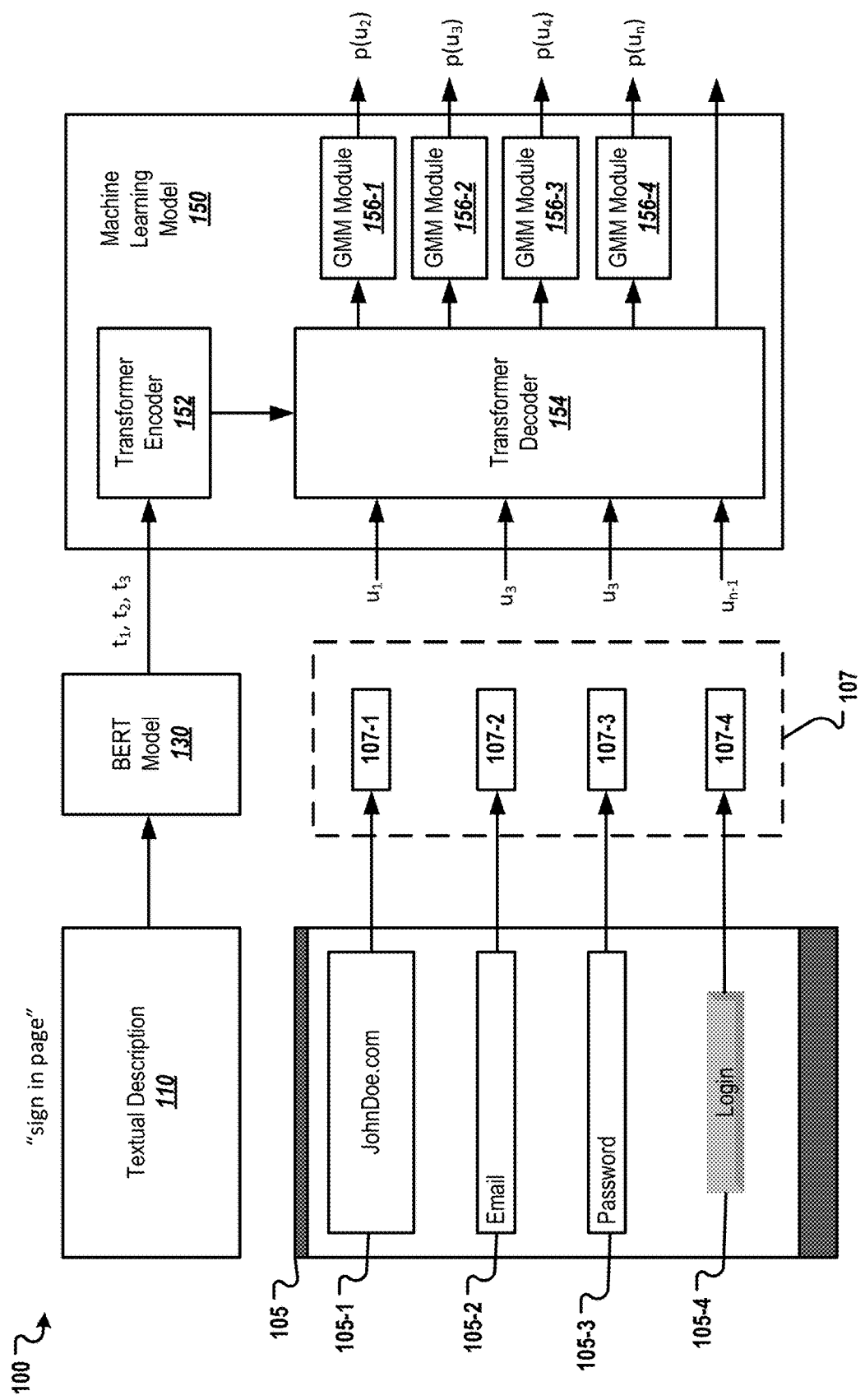
FIG. 1 is a block diagram of an example system that implements a machine learning model that generates a GUI from a text description.
Figure 2:
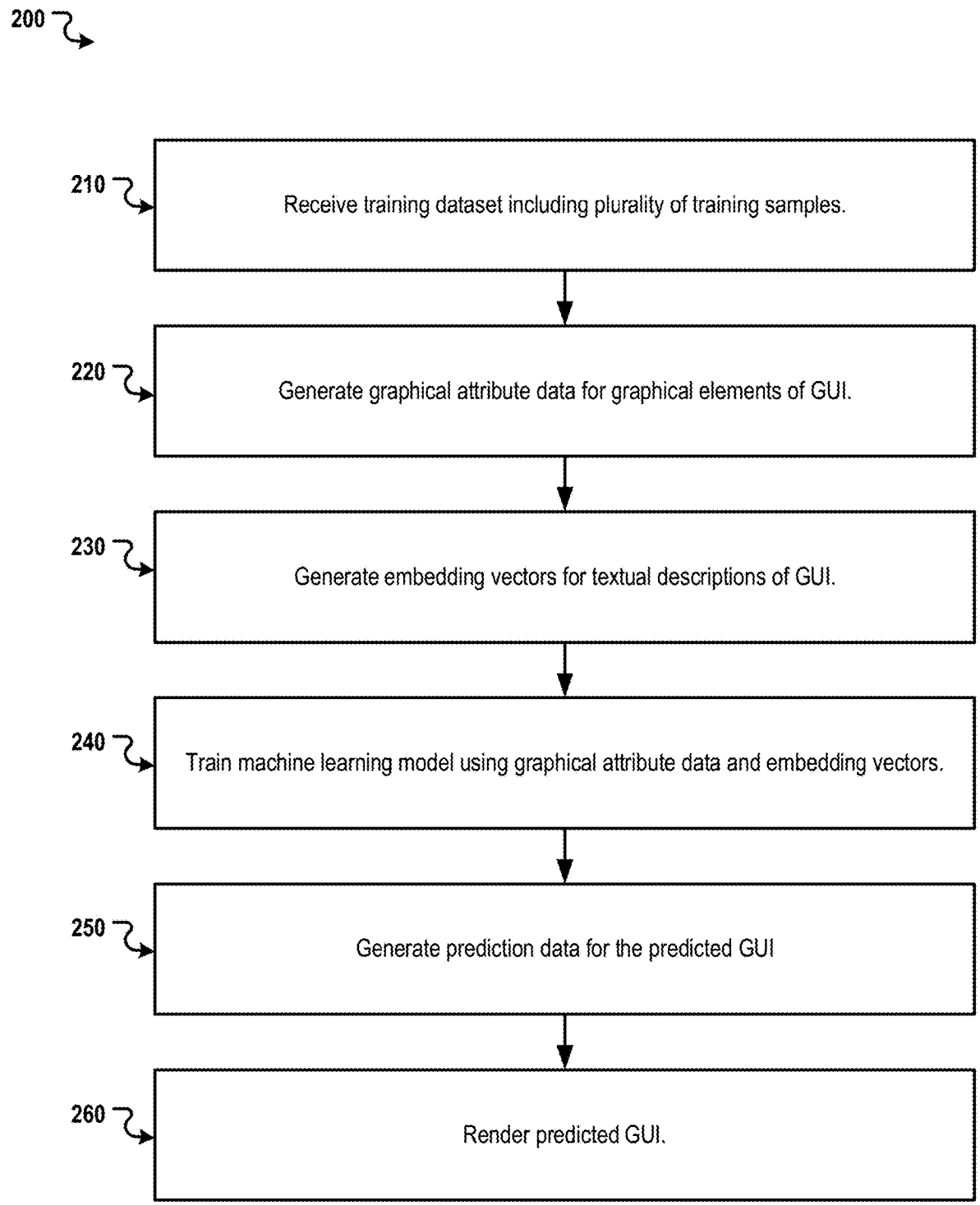
FIG. 2 is a flow diagram of example process of training and using a machine learning model to generate a GUI using the implementation depicted in FIG. 1.
Figure 3:
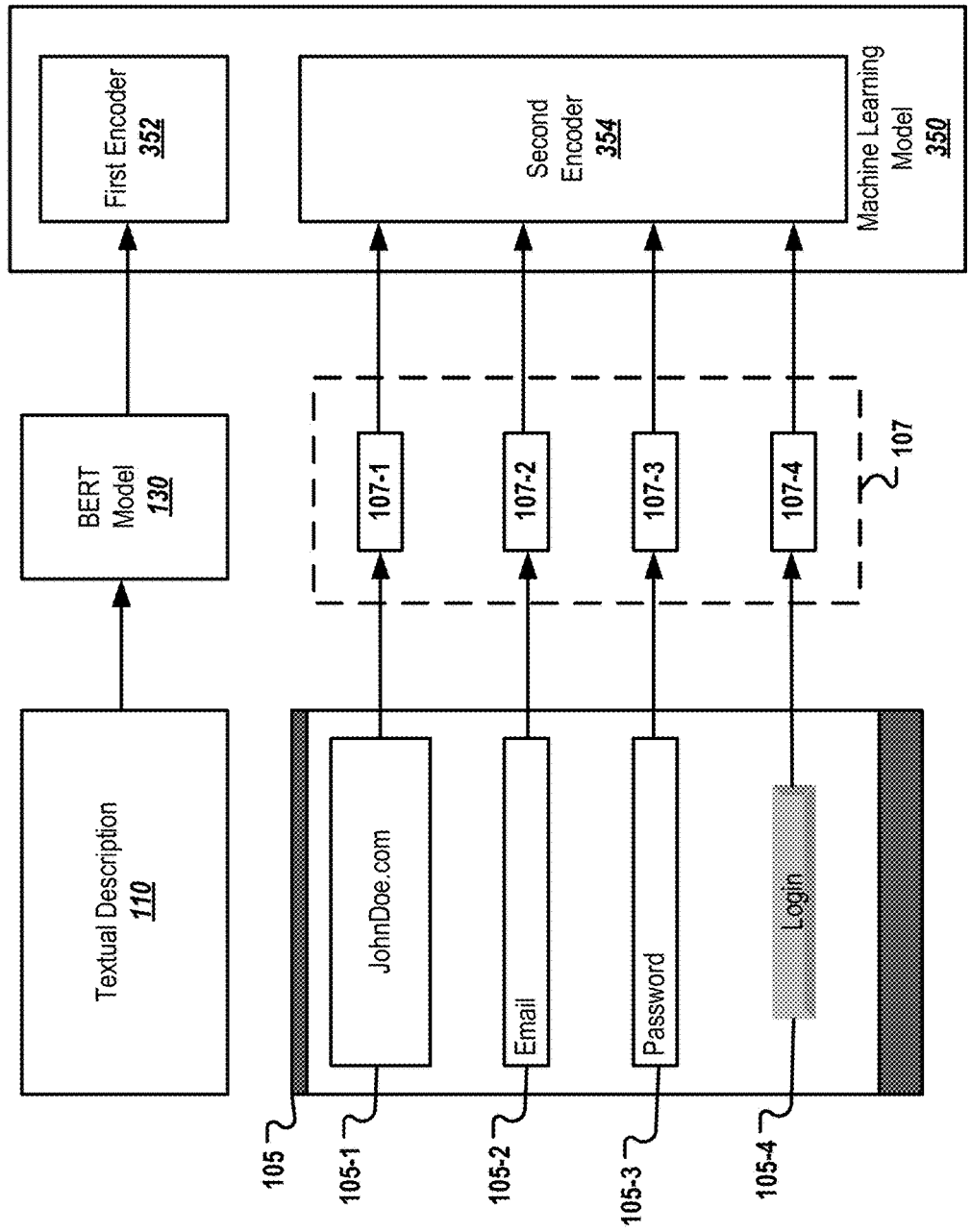
FIG. 3 is a block diagram of an example system that implements a machine learning model that generates a GUI by embedding a text description into user into a common embedding space that is populated with both text and UI embeddings.

A first implementation, described with reference to FIGS. 1 and 2, is UI Generator that utilizes a model, such as a deep generative model, that is able to generate UI mock-ups from scratch with only a high-level text description about the desired UI, and a set of post-processing techniques to filter and present quality UI designs to users. A second implementation, describe with reference to FIGS. 2 and 3, is a multi-modal retriever, which is a deep-learning model that learns cross-modality correspondence and latent representation to retrieve design examples from a large UI corpus using a high-level text description about the desired UIs. These features and additional features are described in more detail below.

UI Generative Model

FIG. 1 is a block diagram of an example system 100 that implements a machine learning model 150 that generates a GUI from a text description. The machine learning model 150 is trained on a training dataset that includes multiple training samples where each training sample includes an image of a GUI and a corresponding textual description of the GUI. In the example of FIG. 1, the system utilizes a transformer-based generative model to generate UI element attributes directly from text descriptions.

In this example, the system uses a bidirectional encoder representation from transformers (BERT) to generate embedding vectors to represent textual descriptions. Also in this example, the machine learning model 150 is a transformer based machine learning model having an encoder 152, a decoder 154 and multiple GMM models 156-1 to 156-4.

In some implementations, the system 100 preforms pre-processing on the training data set. As mentioned above, training a machine learning model 150 to generate a GUI requires a training dataset that includes multiple training samples where each training sample includes an image of a GUI and a corresponding natural language textual description that describes the GUI. For example, if a training sample depicts a login screen with graphical elements such as two textboxes and a submit button where the first textbox is for providing username and the second textbox is for providing password, the textual description can include "a login screen" or "a login screen with two textboxes and a button." Each training sample can also include a structural representation of the graphical elements of the sample GUI. For example, each training sample can also include a JSON file where each node corresponding to a graphical element contains various properties of the graphical element such as class, visibility to the user and the bounds of the element.

Prior to training the machine learning model 150, the system 100 preprocesses the training dataset so as to convert each training sample into a format so that the machine learning model 150 can understand and process the natural language, free-text words, phrases of the textual description and the graphical elements of the GUI. In some implementations, in order to process textual description in natural language, the textual description is pre-processed and transformed into vectors of real numbers using one of any appropriate embedding technique.

In some implementations, the system 100 sorts the UI elements based on their approximate Y coordinates. If two elements have approximately equal Y coordinates, the system then sorts them by their X coordinates. This creates an order where top left UI elements always exist earlier than elements in the bottom right in the sequence.

To make a machine learning model 150 understand and process the natural language textual description, free-text words and phrases of the textual description can be transformed into numeric values. For example, the system 100 can use one-hot encoding to generate a binary vector for each distinct word of the textual description such that each distinct word stands for one dimension of the binary vector and a binary value of the respective word indicates a (1) for the word and (0) otherwise.

In another example, the system 100 can use word embeddings to represent words and phrases of the textual description in vectors of (non-binary) numeric values with much lower and thus denser dimensions by exploiting the similarity and hidden semantic relationships between words. To generate a vector, the system 100 can train using encoding algorithms such as skip-gram model or continuous-bag-of-words (CBOW) models on a text corpus to generate an embedding matrix that includes a list of all words and their corresponding embeddings based on the vocabulary of the text corpus. After generating an embedding matrix, the system 100 can perform a look-up operation on the embedding matrix to select an embedding vector for a particular word in the textual description.

In some implementations, the system 100 can also use bidirectional encoder representations from transformers (BERT) to extract features, namely word and sentence from the textual description of the UIs. For example, assuming that a textual description includes just one sentence, the system 100 can use a pre-trained BERT model 130 such as a BERT_base with 12 layers of transformers blocks and a hidden size of 768 to generate an embedding vectors for each word in a sentence and a special classification (CLS) token that can be further used to generate fixed length vectors for the entire sentence. Using such techniques the system 100 can generate fixed length vectors for each word in the textual description of each training sample in the training dataset. If the textual description for a particular GUI includes k words, the system 100 will generate k fixed length vectors. In the example of FIG. 1, the system 100 uses the BERT model 130 to generate k fixed length vectors where each vector is a real valued vector that includes 768 dimensions.

The system 100 can pre-process the GUI images and the corresponding view hierarchy of the training dataset so as to represent the different graphical elements that make up the GUI. To represent the graphical elements coherently, system 100 can generate graphical attribute data by parameterizing each graphical element using the a tuple $u_i=[x_i, y_i, w_i, h_i, e^c]$ where i is the element identifier, $x_i$ and $y_i$ are the x-y co-ordinates of the i-th element with respect to the GUI, $w_i$ and $h_i$ are the width and height of the i-th element and $e^c$ is the label identifying the class of i-th graphical element. In some implementations, $e^c$ can be a one-hot vector identifying the class of the graphical element. For example, if the entire training dataset includes six unique graphical element types, then for each graphical element, $e^c$ will be a six dimensional binary vector where each distinct element type stands for one dimension of the binary vector such that the binary value of a respective graphical element is 1 for the respective dimension and 0 otherwise.

In general, GUIs includes multiple graphical elements such as buttons, drop down menus, text boxes, tabs, etc. When the GUI includes multiple graphical elements, the system 100 can generate graphical attribute data that includes multiple tuples sorted based on the values of the tuples. For example, assume that a GUI includes a button and a textbox. The system 100 can generate graphical attribute data that includes a first tuple for the button and a second tuple for the textbox. The system 100 can use the two tuples for training the machine learning model 150 in a sorted order based on the value of the y-coordinate of the two tuples. If the two graphical elements have the same y-coordinate, the system 100 can use the value of x-coordinate to sort the tuples. FIG. 1 shows an example training sample of a GUI 105 from the training dataset. The GUI 105 includes four graphical elements 105-1 to 105-4. Each of these four graphical elements is represented using a tuple u, each represented by respective boxes 107-1-107-4. Here, the graphical attribute data of the GUI which includes four graphical elements 107-1 to 107-4 ordered according to their corresponding y-coordinates.

In some implementations, the system 100 can select only a subset of graphical elements from a training sample that can include multiple graphical elements. For example, if the number of graphical elements exceeds a pre-specified threshold, the system 300 can select a subset of graphical elements from the GUI to be represented in the graphical attribute data. In other implementations, if the training GUI has an unknown graphical element (e.g., a graphical element that the system cannot or fails to classify), the system 100 can filter the unknown graphical element from the graphical attribute data. In another implementation, if the system 100 filters and/or removes a particular graphical element from the graphical attribute data, the system 100 can also remove other graphical elements that may be directly related to the particular graphical element. For example, if the system 100 removes a particular graphical element, the system 100 can also remove graphical elements that are structurally or contextually dependent on the particular graphical element.

Though the pre-processing of the training dataset has been explained as a step that is performed prior to training the machine learning model 150, the pre-processing of the training dataset can be performed during the training process. For example, while training the machine learning model 150, the training process can iterate through the training samples of the training dataset while performing the pre-processing step of the training samples and training the machine learning model 150 using the pre-processed training samples. For example, the training process can select a training sample from the training dataset, process the selected training sample according to the techniques and methods described above and train the machine learning model 150.

In some implementations, the machine learning model 150 can be a transformer model that includes an encoder 152 and a decoder 154. The encoder 152 and decoder 154 can respectively include multiple encoder and decoder neural network layers where each encoder layer includes a self-attention layer and a feed forward layer and each decoder layer includes a self-attention layer, a cross attention layer and a feed forward layer. For example, both encoder 152 and decoder 154 has hidden layer size of 64, 6 layers and an intermediate layer size of 256.

In some implementations, the encoder 152 of the machine learning model 150 is configured to receive as input embedding vectors of the textual descriptions of a GUI and generate as output a vector (referred to as an encoder output) that is mapping of the embedding vectors of the textual descriptions of a GUI into a higher dimensional space. For example, if a textual description reads "login page with two buttons," the encoder 132 of the machine learning model 150 can receive as input five embedding vectors where the five embedding vectors are for the words "login", "page", "with", "two" and "buttons."

In other implementations, the machine learning model 152 may include only the decoder 154. In these implementations, the decoder 154 receives as input the embedding vectors of the textual descriptions of a GUI.

In some implementations, the decoder 154 of the machine learning model 150 is an autoregressive model that generates prediction data that represents the graphical elements of a predicted GUI in a sequence i.e., the decoder 154 of the machine learning model 150 generates the graphical elements of the predicted GUI iteratively. For example, while predicting a GUI, if the machine learning model 150 generates five graphical elements for the predicted GUI, the decoder 154 will perform five iterations and during each iteration the decoder 154 will generate a graphical element of the predicted GUI. More particularly, for the autoregressive model, the decoder takes all the previous UI elements $u_{1 \ldots i-1}$ and the encodings from the encoder, and outputs the next UI element $u_i$ in the sequence at any particular timestep.

The prediction data is generally in the same format as the graphical attribute data i.e., each element of the predicted GUI is a tuple $u'_i = [x'_i, y'_i, w'_i, h'_i, e^{c'}]$ where i is the element identifier, $x'_i$ and $y'_i$ are the x-y co-ordinates of the i-th element of the predicted GUI, $w'_i$ and $h'_i$ are the width and height of the i-th element and $e^{c'}$ is the label identifying the class of i-th graphical element of the predicted GUI.

As described above, the decoder 154 of the machine learning model 150 is configured to receive as input, the encoder output and a sequence graphical elements of the predicted GUI that were previously predicted by the decoder 154. In other words, while predicting the i-th graphical element, the decoder 154 processes the encoder output and the tuples of the graphical elements that were already predicted i.e., tuples $u'_1$ to $u'_{i-1}$. For example, while predicting the third graphical element i.e., tuple $u'_3$, the decoder 154 processes the encoder output and the two previously predicted graphical elements i.e., tuples $u'_1$ and $u'_2$.

In some implementations, the machine learning model 150 can be configured to generate probability distributions for the parameters of the tuple instead of predicting values of the parameters. Since $x_i$, $y_i$, $w_i$ and $h_i$ are continuous parameters, the machine learning model 150 can include four Gaussian Mixture Models (GMM) appended to the decoder 154 that can model the output parameters $x'_i$, $y'_i$, $w'_i$ and $h'_i$ as probability distributions. For example, the machine learning model 150 can include four GMM models 150-1 to 150-4 that can model the parameters $x'_i$, $y'_i$, $w'_i$ and $h'_i$ as probability distributions. In such implementations, instead of generating values of the parameters $x'_i$, $y'_i$, $w'_i$ and $h'_i$ the decoder 154 can generate values that can be further provided as input to the respective GMM models to model a respective probability distributions. For example, the GMM models can model each of the parameters as a separate Gaussian distribution parameterized by mean μ and standard deviation σ. Since the parameter $e^{c'}$ of the tuple is a class identifying the type of graphical element, $e^{c'}$ is kept as is i.e., the decoder 154 generates the class of $e^{c'}$.

In some implementations, to generate a tuple $u'_i=[x'_i, y'_i, w'_i, h'_i, e^{c'}]$ for a graphical element of a predicted GUI, the system 100 can sample $x'_i, y'_i, w'_i$ and $h'_i$ from the respective probability distributions and the parameter $e^{c'}$ from the decoder 154. This can be defined as $p(u'_i)=p(u'_i|\theta)$ where $u'_i=[x'_i, y'_i, w'_i, h'_i, e^{c'}]$ and $\theta$=Transformer($u'_{1\ldots i-1}, t_{1\ldots k}$) and where $t_{1\ldots k}$ are the k embedding vectors that represent the textual description of a GUI.

Since the decoder 154 is an autoregressive model, the number of graphical elements that are predicted is determined automatically by the machine learning model 150. For example, if the machine learning model 150 determines to generate four graphical elements for a predicted GUI, the decoder 154 will iterate five times where in the first four iterations the decoder 154 and the GMM module 156 will generate four tuples and the fifth iteration will generate an end-of-sentence (EOS) token to indicate the end of tuple generation.

In other implementations, the decoder 154 can be trained to predict a categorical probability distribution of the graphical elements. Accordingly, in these implementations, the GMMs 156 can be omitted.

In some implementations, the machine learning model 150 is trained by adjusting a plurality of training parameters of the machine learning model 150 using a training process implemented by the system 100. The training process for the machine learning model 150 is an iterative process that samples a training sample from the training dataset. After sampling, the training process generates the graphical attribute data for the GUI of the training sample and also generates the embedding vectors to represent the textual description of the GUI in the training sample. After generating the graphical attribute data and the embedding vectors, the training process uses the machine leering model 150 to generate prediction data that indicates graphical elements of a predicted GUI. The prediction data is generally in the same format as the graphical attribute data i.e., each element of the predicted GUI is a tuple $u'_i=[x'_i, y'_i, w'_i, h'_i, e^{c'}]$ where i is the element identifier, $x'_i$ and $y'_i$ are the x-y co-ordinates of the i-th element of the predicted GUI, $w'_i$ and $h'_i$ are the width and height of the i-th element and $e^{c'}$ is the label identifying the class of i-th graphical element of the predicted GUI. The following is an example of iteration of the training process.

In some implementations, the training process computes a loss value based on the graphical attribute data of the GUI of the training sample that was provided as input to the decoder 154 and the prediction data of the graphical elements of a predicted GUI. Based on the loss value, the training process then adjusts the parameters of the machine learning model 150. In some implementations, the machine learning model 150 minimizes the total log likelihood of the graphical attribute data of the GUI of the training sample that was provided as input to the decoder 154 based on the probability distributions of the parameters $x'_i, y'_i, w'_i$ and $h'_i$ of the tuple $u'_i$. In such an implementations, the Loss function of the machine learning model 150 can be represented as $$L(\text{Transformer}) = -\sum_{i=2}^{n}\log(p(u'_i))$$

In some implementations, the training process uses a validation set to evaluate the performance of the machine learning model 150. In general, the validation set includes multiple samples similar to the training samples of the training dataset.

In some implementations, the training process uses an Adam optimizer with a starting learning rate of $10^{-3}$ which is later decreased to $10^{-4}$ and then $10^{-5}$ when a validation loss computed using a validation set balances around a constant value. However, depending upon the specific implementation any optimization algorithm other than the Adam optimizer can be used. For example, Root Mean Squared Propagation (RMSProp), Adamax, Stochastic Gradient Descent (SGD) are optimizers that can also be used to train the machine learning model 150.

In some implementations, the training process can filter out low-quality predicted GUIs that may be generated by the generative modelling of the parameters of the tuple. For this the training process can calculate values for metrics such as overlap that indicates the percentage of area of the GUI that is occupied by at least two graphical elements, intersection-over-union (IOU) that indicates an average intersection-over-union between two graphical elements in the GUI, and alignment that approximates the inter-element distance between graphical elements in the GUI.

In some implementations, the training process computes one or more of the above mentioned metric values for each of the sample in the validation set. The training process also computes one or more metric values of the predicted GUIs and filters out the predicted GUIs that has any of the metrics that exceeds the average value in the validation set.

In some implementations, the system 100 estimates each metric as separate probability distributions by modeling their values for all UIs in the validation set. The system 100 then determines the candidate UI's score by taking their cumulative density function in the respective distributions, and multiplying those values together. This is based on the assumption that each of the distributions are independent for each UI example. Finally, the system 100 takes the top-50%-scored UIs (or some other scoring threshold) generated for each text description and use those as candidates of final outputs to users.

After training the machine learning model 150 and during prediction a textual description of a GUI that generally describes the GUI is provided by the user of the system. For example, if the user wants a GUI with a login page with two buttons, the textual description can be something similar to "login page with two buttons."

The system 100 then preprocesses the textual description so as to convert textual description into a format using techniques that were used during the training process of the machine learning model. This allows the textual description to be converted into a format that the machine learning model can process and has been trained on. The preprocessing can also include other techniques such as correction of spelling errors, using conventional automated, computer-based algorithms and are generally identical to the preprocessing step performed while training the machine learning model 150. In this example, the system 100 uses a pre-trained BERT model 130 such as a BERT_base with 12 layers of transformers blocks and a hidden size of 768 to generate an embedding vectors for each word in a sentence and a special classification (CLS) token that can be further used to generate fixed length vectors for the entire textual description. For example, if the textual description for the anticipated GUI includes k words, the system 100 will generate k fixed length vectors. According to the current example, the system 100 can use the BERT model 130 to generate k fixed length vectors where each vector is a real valued vector that includes 768 dimensions.

After generating the embedding vectors, the embedding vectors are provided as input to the encoder 152 of the machine learning model 150. The encoder 152 generates an encoder output that is further provided as input to the decoder 154. If the decoder 154 decides to generate multiple graphical elements, the decoder 154 can generate the graphical elements autoregressively. For example, to generate three graphical elements of a predicted GUI, the decoder 154 can iterate three times and in each of the iterations, the decoder will generate prediction data indicating graphical elements of the predicted GUI. During each iteration of the decoder 154, the decoder 154 can also receive as input the previously predicted graphical element. For example, while predicting the second graphical element in the second iteration of the decoder 154, the decoder 154 receives as input prediction data of the first graphical element.

The prediction data is generally in the same format as the graphical attribute data i.e., each element of the predicted GUI is a tuple $u'_i = [x'_i, y'_i, w'_i, h'_i, e^{c'}]$ where i is the element identifier, $x'_i$ and $y'_i$ are the x-y co-ordinates of the i-th element of the predicted GUI, $w'_i$ and $h'_i$ are the width and height of the i-th element and $e^{c'}$ is the label identifying the class of i-th graphical element of the predicted GUI.

In some implementations, the machine learning model 150 generates parameters of probability distributions that model the parameters of the tuple describing graphical elements instead of predicting values of the parameters directly. Since $x'_i, y'_i, w'_i$ and $h'_i$ are continuous parameters, the machine learning model 150 can use the four Gaussian Mixture Models (GMM) appended to the decoder 154 to model the output parameters $x'_i, y'_i, w'_i$ and $h'_i$ as probability distributions. For example, the four GMM models 150-1 to 150-4 model the parameters $x'_i, y'_i, w'_i$ and $h'_i$ as probability distributions. For example, the GMM models can model each of the parameters as a separate Gaussian distribution parameterized by mean μ and standard deviation σ. Since the parameter $e^{c'}$ of the tuple is a class identifying the type of graphical element, the decoder 154 generates the class $e^{c'}$. In such implementations, to generate a tuple $u'_i = [x'_i, y'_i, w'_i, h'_i, e^{c'}]$ for a graphical element of a predicted GUI, the system 100 samples $x'_i, y'_i, w'_i$ and $h'_i$ from the respective probability distributions using the parameters of the respective probability distributions generated as output by the GMM models. The parameter $e^c$ is generated by the decoder 154. Depending upon the implementations, system 100 can sample multiple values of the parameters $x'_i, y'_i, w'_i$ and $h'_i$ so as to generate prediction data for multiple predicted GUIs.

In some implementations, after generating the prediction data that includes graphical elements of the predicted GUI, the system 100 uses the prediction data to render the predicted GUIs. For example, the system 100 can include a rendering apparatus that implements automated techniques and methods that can process the prediction data to render the predicted GUIs. In some implementations, the rendering apparatus can render the predicted GUIs as a Hypertext Markup Language (HTML) document. However, depending upon the implementations, other markup languages such as Standard Generalized Markup Language (SGML) or Extensible Markup Language (XML) can also be used.

FIG. 2 is a flow diagram of example process 200 of training and using a machine learning model 150 to generate a GUI using the implementation depicted in FIG. 1. Operations of the process 200 can be implemented, for example, by the components of the system 100 realized in one or more computers or data processing apparatus. Operations of the process 200 can also be implemented as instructions stored on one or more computer readable media which may be non-transitory, and execution of the instructions by one or more data processing apparatus can cause the one or more data processing apparatus to perform the operations of the process 200.

The process 200 receives training dataset including plurality of training samples (210). For example, training a machine learning model 150 to generate a GUI requires a training dataset that includes multiple training samples where each training sample includes an image of a GUI and a corresponding natural language textual description that describes the GUI. For example, if a training sample depicts a login screen with graphical elements such as two textboxes and a submit button where the first textbox is for providing username and the second textbox is for providing password, the textual description can include "a login screen" or "a login screen with two textboxes and a button." Each training sample can also include a structural representation of the graphical elements of the sample GUI. For example, each training sample can also include a JSON file where each node corresponding to a graphical element contains various properties of the graphical element such as class, visibility to the user and the bounds of the element. The training dataset can be obtained as screen shots from a plurality of user devices such as smartphones, personal computers and tablets. The screen shot can be taken from devices that show GUIs of different application and digital content. The screen shots can then be analyzed by human evaluators who review the screenshot and provide a textual description of the GUI.

The process 200 generates graphical attribute data for graphical elements of GUI (220). Prior to training the machine learning model 150, the system 100 preprocesses the training dataset so as to convert the graphical elements of a GUI in a training sample into a format so that the machine learning model 150 can understand and process the graphical elements of the GUI. For example, the system 100 can pre-process the GUI images and the corresponding view hierarchy (if available) of the training dataset so as to represent the different graphical elements that make up the GUI. To represent the graphical elements coherently, the system 100 can generate graphical attribute data by parameterizing each graphical element using the a tuple $u_i = [x'_i, y'_i, w'_i, h'_i, e^c]$ where i is the element identifier, $x_i$ and $y_i$ are the x-y co-ordinates of the i-th element with respect to the GUI, $w_i$ and $h_i$ are the width and height of the i-th element and $e^c$ is the label identifying the class of i-th graphical element. In some implementations, $e^c$ can be a one-hot vector identifying the class of the graphical element. For example, if the entire training dataset includes 6 unique graphical element types, then for each graphical element, $e^c$ will be a six dimensional binary vector where each distinct element type stands for one dimension of the binary vector such that the binary value of a respective graphical element is 1 for the respective dimension and 0 otherwise.

When the GUI includes multiple graphical elements, the system 100 can generate graphical attribute data that includes multiple tuples sorted based on the values of the tuples. For example, assume that a GUI includes a button and a textbox. The system 100 can generate graphical attribute data that includes a first tuple for the button and a second tuple for the textbox. The system 100 can use the two tuples for training the machine learning model 150 in a sorted order based on the value of the y-coordinate of the two tuples. If the two graphical elements have the same y-coordinate, the system 100 can use the value of x-coordinate to sort the tuples. For example, FIG. 1 shows a training sample of a GUI 105 from the training dataset. The GUI 105 includes four graphical elements 105-1 to 105-4. Each of these four graphical elements is represented using a tuple. For example, 107 represents the graphical attribute data of the GUI which includes four graphical elements 107-1 to 107-4 ordered according to their corresponding y-coordinates.

The system 100 can select only a subset of graphical elements from a training sample that can include multiple graphical elements. For example, if the number of graphical elements exceeds a pre-specified threshold, the system 300 can select a subset of graphical elements from the GUI to be represented in the graphical attribute data. In other implementations, if the GUI has an unknown graphical element, the system 100 can filter the unknown graphical element from the graphical attribute data. In another implementation, if the system 100 filters and/or removes a particular graphical element from the graphical attribute data, the system 100 can also remove other graphical elements that may be directly related to the particular graphical element. For example, if the system 100 removes a particular graphical element, the system 100 can also remove graphical elements that are structurally or contextually dependent on the particular graphical element.

The process 200 generates embedding vectors for textual descriptions of GUI (230). For example, the textual description of the GUIs of the training dataset is pre-processed and transformed into vectors of real numbers using one of the many embedding techniques. For example, the system 100 can identify a plurality of words, individual characters and multi word sequences in the textual description. To make a machine learning model 150 understand and process the natural language textual description, free-text words and phrases of the textual description can be transformed into numeric values. For example, the system 100 can use one-hot encoding to generate a binary vector for each distinct word of the textual description such that each distinct word stands for one dimension of the binary vector and a binary value of the respective word indicates a (1) for the word and (0) otherwise.

In another example, the system 100 can use word embeddings to represent words and phrases of the textual description in vectors of (non-binary) numeric values with much lower and thus denser dimensions by exploiting the similarity and hidden semantic relationships between words. To generate a vector, the system 100 can train using encoding algorithms such as skip-gram model or continuous-bag-of-words (CBOW) models on a text corpus to generate an embedding matrix that includes a list of all words and their corresponding embeddings based on the vocabulary of the text corpus. After generating an embedding matrix, the system 100 can perform a look-up operation on the embedding matrix to select an embedding vector for a particular word in the textual description.

In another example, the system 100 can also use bidirectional encoder representations from transformers (BERT) to extract features, namely word and sentence from the textual description of the GUIs. For example, the system 100 can use a pre-trained BERT model 130 such as a BERT_base with 12 layers of transformers blocks and a hidden size of 768 to generate an embedding vectors for each word in a sentence and a special classification (CLS) token that can be further used to generate fixed length vectors for the entire sentence. Using such techniques the system 100 can generate fixed length vectors for each word in the textual description of each training sample in the training dataset. If the textual description for a particular GUI includes k words, the system 100 will generate k fixed length vectors.

The process 200 trains a machine learning model using graphical attribute data and embedding vectors (240). For example, the machine learning model 150 is trained by adjusting a plurality of training parameters of the machine learning model 150 using a training process implemented by the system 100. The training process for the machine learning model 150 is an iterative process that samples a training sample from the training dataset. After sampling, the training process generates the graphical attribute data for the GUI of the training sample and also generates the embedding vectors to represent the textual description of the GUI in the training sample. After generating the graphical attribute data and the embedding vectors, the training process uses the machine leering model 150 to generate prediction data that indicates graphical elements of a predicted GUI.

During training, the training process computes a loss value based on the graphical attribute data of the GUI of the training sample that was provided as input to the decoder 154 and the prediction data of the graphical elements of a predicted GUI. Based on the loss value, the training process then adjusts the parameters of the machine learning model 150. For example, the training process of the machine learning model 150 minimizes the total log likelihood of the graphical attribute data of the GUI of the training sample that was provided as input to the decoder 154 based on the probability distributions of the parameters $x'_i$, $y'_i$, $w'_i$ and $h'_i$ of the tuple $u'_i$. The loss function of the machine learning model 150 can be represented as $$L(\text{Transformer}) = -\sum_{i=2}^{n} \log(p(u'_i))$$

The training process uses a validation set to evaluate the performance of the machine learning model 150. In general, the validation set includes multiple samples similar to the training samples of the training dataset. The training process can filter out low-quality predicted GUIs that may be generated by the generative modelling of the parameters of the tuple. For this the training process can use metrics such as overlap that indicates the percentage of area of the GUI that is occupied by at least two graphical elements, intersection-over-union (IOU) that indicates an average intersection-over-union between two graphical elements in the GUI and alignment that approximates the inter-element distance between graphical elements in the GUI. The training process can compute one or more values of the above mentioned metrics for each of the sample in the validation set. The training process also computes one or more metrics of the predicted GUIs and filters out the predicted GUIs that has any of the metric values that exceeds the average value in the validation set, as described above.

The training process uses an Adam optimizer with a starting learning rate of $10^{-3}$ which is later decreased to $10^{-4}$ and then $10^{-5}$ when a validation loss computed using a validation set balances around some constant value.

The process 200 generates prediction data for the predicted GUI (250). For example, after training the machine learning model 150 and during prediction a textual description of a GUI that generally describes the GUI is provided by the user of the system. For example, if the user wants a GUI with a login page with two buttons, the textual description can be something similar to "login page with two buttons."

The system 100 then preprocesses the textual description so as to convert textual description into a format using techniques that were used during the training process of the machine learning model. This allows the textual description to be converted into a format that the machine learning model can process. In this example, the system 100 uses a pre-trained BERT model 130 such as a BERT_base with 12 layers of transformers blocks and a hidden size of 768 to generate an embedding vectors for each word in a sentence and a special classification (CLS) token that can be further used to generate fixed length vectors for the entire textual description. For example, if the textual description for the anticipated GUI includes k words, the system 100 will generate k fixed length vectors. According to the current example, the system 100 can use the BERT model 130 to generate k fixed length vectors where each vector is a real valued vector that includes 768 dimensions.

After generating the embedding vectors, the embedding vectors are provided as input to the encoder 152 of the machine learning model 150. The encoder 152 generates an encoder output that is further provided as input to the decoder 154. If the decoder 154 decides to generate multiple graphical elements, the decoder 154 can generate the graphical elements autoregressively. For example, to generate three graphical elements of a predicted GUI, the decoder 154 can iterate three times and in each of the iterations, the decoder will generate prediction data indicating graphical elements of the predicted GUI. During each iteration of the decoder 154, the decoder 154 can also receive as input the previously predicted graphical element. For example, while predicting the second graphical element in the second iteration of the decoder 154, the decoder 154 receives as input prediction data of the first graphical element.

The prediction data is generally in the same format as the graphical attribute data i.e., each element of the predicted GUI is a tuple $u'_i=[x'_i, y'_i, w'_i, h'_i, e^{c'}]$ where i is the element identifier, $x'_i$ and $y'_i$ are the x-y co-ordinates of the i-th element of the predicted GUI, $w'_i$ and $h'_i$ are the width and height of the i-th element and $e^{c'}$ is the label identifying the class of i-th graphical element of the predicted GUI.

In some implementations, the machine learning model 150 generates parameters of the probability distributions instead of predicting values of the parameters of the tuple defining graphical elements. Since $x_i$, $y_i$, $w_i$ and $h_i$ are continuous parameters, the machine learning model 150 can use the four Gaussian Mixture Models (GMM) appended to the decoder 154 to model the output parameters $x'_i$, $y'_i$, $w'_i$ and $h'_i$ as probability distributions. For example, the four GMM models 150-1 to 150-4 model the parameters $x'_i$, $y'_i$, $w'_i$ and $h'_i$ as probability distributions. For example, the GMM models can model each of the parameters as a separate Gaussian distribution parameterized by mean μ and standard deviation σ. Since the parameter $e^{c'}$ of the tuple is a class identifying the type of graphical element, the decoder 154 generates the class $e^{c'}$. In such implementations, to generate a tuple $u'_i=[x'_i, y'_i, w'_i, h'_i, e^{c'}]$ for a graphical element of a predicted GUI, the system 100 samples $x'_i, y'_i, w'_i$ and $h'_i$ from the respective probability distributions using the parameters of the respective probability distributions generated as output by the GMM models. The parameter $e^c$ is generated by the decoder 154.

The process 200 renders the predicted GUI (260). For example, after generating the prediction data that includes graphical elements of the predicted GUI, the system 100 uses the prediction data to render the predicted GUIs. For example, the system 100 can include a rendering apparatus that implements automated techniques and methods that can process the prediction data to render the predicted GUIs. In some implementations, the rendering apparatus can render the predicted GUIs as a Hypertext Markup Language (HTML) document. However, depending upon the implementations, other markup languages such as Standard Generalized Markup Language (SGML) or Extensible Markup Language (XML) can also be used.

Multi-Modal Model

FIG. 3 is a block diagram of an example system 300 that implements a machine learning model 350 that generates a GUI by embedding a text description into user into a common embedding space that is populated with both text and UI embeddings. Similar to the machine learning model 150, the machine learning model 350 is trained on a training dataset that includes multiple training samples where each training sample includes an image of a GUI and a corresponding textual description of the GUI. In this example, the system uses a bidirectional encoder representations from transformers (BERT) to generate embedding vectors to represent textual descriptions. Also in this example, the machine learning model 350 includes two encoder 352 and 354.

In some implementations, the system 300 uses similar techniques for preprocessing the training samples of the training dataset as described with reference to the system 100. For example, prior to training the machine learning model 350, the system 300 preprocesses the training dataset so as to convert each training sample into a format so that the machine learning model 350 can understand and process the natural language, free-text words, phrases of the textual description and the graphical elements of the GUI. This includes identifying a plurality of words, individual characters and multi word sequences in the textual description and generating vectors of real numbers using one of the many appropriate embedding techniques. For example, the system 300 can use word embeddings to represent words and phrases of the textual description in vectors of (non-binary) numeric values with much lower and thus denser dimensions by exploiting the similarity and hidden semantic relationships between words. To generate a vector, the system 300 can train using encoding algorithms such as skip-gram model or continuous-bag-of-words (CBOW) models on a text corpus to generate an embedding matrix that includes a list of all words and their corresponding embeddings based on the vocabulary of the text corpus. After generating an embedding matrix, the system 300 can perform a look-up operation on the embedding matrix to select an embedding vector for a particular word in the textual description.

In another example, the system 300 can also use bidirectional encoder representations from transformers (BERT) to extract features, namely word and sentence from the textual description of the GUIs. For example, assuming that a textual description includes just one sentence, the system 300 can use a pre-trained BERT model 130 such as a BERT_base with 12 layers of transformers blocks and a hidden size of 768 to generate an embedding vectors for each word in a sentence and a special classification (CLS)

token that can be further used to generate fixed length vectors for the entire sentence. Using such techniques the system 300 can generate fixed length vectors for each word in the textual description of each training sample in the training dataset. If the textual description for a particular GUI includes k words, the system 300 will generate k fixed length vectors. According to the current example, the system 300 can use the BERT model 130 to generate k fixed length vectors where each vector is a real valued vector that includes 768 dimensions.

To pre-process the graphical elements of GUIs in the training dataset, the system 300 can pre-process the GUI images and the corresponding view hierarchy of the training dataset so as to represent the different graphical elements that make up the GUI. To represent the graphical elements coherently, the system 300 can generate graphical attribute data by parameterizing each graphical element using the a tuple $u_i = [x_i, y_i, w_i, h_i, e^c]$ where i is the element identifier, $x_i$ and $y_i$ are the x-y co-ordinates of the i-th element with respect to the GUI, $w_i$ and $h_i$ are the width and height of the i-th element and $e^c$ is the label identifying the class of i-th graphical element. In some implementations, $e^c$ can be a one-hot vector identifying the class of the graphical element. For example, if the entire training dataset includes six unique graphical element types, then for each graphical element, $e^c$ will be a six dimensional binary vector where each distinct element type stands for one dimension of the binary vector such that the binary value of a respective graphical element is 1 for the respective dimension and 0 otherwise.

When the GUI includes multiple graphical elements, the system 300 can generate graphical attribute data that includes multiple tuples sorted based on the values of the tuples. For example, assume that a GUI includes a button and a textbox. The system 300 can generate graphical attribute data that includes a first tuple for the button and a second tuple for the textbox. The system 300 can use the two tuples for training the machine learning model 350 in a sorted order based on the value of the y-coordinate of the two tuples. If the two graphical elements have the same y-coordinate, the system 300 can use the value of x-coordinate to sort the tuples. FIG. 3 shows an example training sample of a GUI 105 from the training dataset. The GUI 105 includes four graphical elements 105-1 to 105-4. Each of these four graphical elements is represented using a tuple. For example, 107 represents the graphical attribute data of the GUI which includes four graphical elements 107-1 to 107-4 ordered according to their corresponding y-coordinates.

In some implementations, the machine learning model 350 can be a dual encoder machine learning model that includes a first encoder 352 and a second encoder 354. The first encoder 352 and the second encoder 354 can respectively include multiple neural network layers where each neural network layer can include multiple neural network nodes and a multiple training parameters. In some implementations, the first encoder 352 and the second encoder 354 can be transformer based encoders that includes multiple self-attention layers and cross attention layers. For example, the first and the second encoder can have a hidden layer size of 64 and an intermediate layer size of 256 and four layers. In some implementations, the first encoder is a text encoder and the second encoder is a UI encoder, described in more detail below.

In some implementations, the first encoder 352 is configured to receive as input, embedding vectors of the textual descriptions of a GUI and generate as output a vector (referred to as a first encoder output vector) which is mapping of the embedding vectors of the textual descriptions of a GUI into a higher dimensional space. For example, if a textual description reads "login page with two buttons," the first encoder 352 of the machine learning model 350 can receive as input five embedding vectors where the five embedding vectors are for the words "login", "page", "with", "two" and "buttons" and generate as output a single first encoder output vector. This can be represented as $l = \text{FirstEncoder}(t_{1 \ldots m})$ where l is the first encoder output vector and $t_{1 \ldots m}$ are the m embedding vectors for m words of the textual description.

In some implementations, the second encoder 354 of the machine learning model 350 is configured to receive as input, the sequence graphical elements of a GUI and generate as output a vector (referred to as a second encoder output vector) which is mapping of the graphical attribute data of the elements of a GUI into a higher dimensional space. For example, if the GUI includes two buttons, the second encoder 354 of the machine learning model 350 will receive as input, graphical attribute data of the two buttons and generate as output a single second encoder output vector. This can be represented as $r = \text{SecondEncoder}(u_{1 \ldots n})$ where r is the second encoder output vector and $u_{1 \ldots n}$ is the graphical attribute data of n graphical elements of a GUI.

In some implementations, the first second encoder output vector and the second encoder output vector are of the same dimensions. For example, the first encoder 352 and the second encoder 354 can implement one or more vector transformation neural networks to generate output vectors of a same pre-defined length.

In some implementations, the machine learning model 350 is trained by adjusting a plurality of training parameters of the first encoder 32 and the second encoder 354 using a training process implemented by the system 300. The training process for the machine learning model 350 is an iterative process that samples a training sample from the training dataset. After sampling, the training process generates the graphical attribute data for the GUI of the training sample and also generates the embedding vectors to represent the textual description of the GUI in the training sample. After generating the graphical attribute data and the embedding vectors, the training process uses the first encoder 352 and the second encoder 354 to generate a pair of first encoder output vector and a second encoder output vector. The training process then uses the first encoder output vector and the second encoder output vector to adjust the training parameters of the first encoder 352 and the second encoder 354. The following is an example of iteration of the training process.

In some implementations, the training process of the machine learning model 350 can use batch processing to generate multiple pairs of first encoder output vector and a second encoder output vector. For example, during each iteration, the training process can select K training samples from the training dataset and for each of the K training samples, provide the corresponding embedding vectors of the textual descriptions as input to the first encoder 352 and the corresponding graphical attribute data to the second encoder 354. By doing so, the training process can generate K pairs of first encoder output vector and second encoder output vector. The selection process of the K training samples can be based on the cross validation techniques of the system 300. For example, the system 300 can train the machine learning model 350 using K-fold cross validation, stratified K-fold cross validation etc.

In some implementations, the training process computes a loss value based on the K pairs of first encoder output vector and second encoder output vector that indicates the distance between the first encoder output vector and second encoder output vector. In some implementations, the loss value can also represent the distance between the first encoder output vector and second encoder output vector of each of the K pairs. The loss value can be computed using a loss function that can be represented as $$L(FirstEncoder, SecondEncoder) = -\frac{1}{k}\sum_{i=1}^{K} S(l_i, r_i) -$$

$$\log\sum_{j=1, j\neq i}^{K} \exp(S(l_i, r_j)) - \frac{1}{k}\sum_{i=1}^{K} S(r_i, l_i) - \log\sum_{j=1, j\neq i}^{K} \exp(S(l_i, r_j))$$

where $S(l_i, r_i)$ is the dot-product of the i-th first encoder output vector and second encoder output vector.

In some implementations, the training process adjusts the values of the training parameters of the first encoder 352 and the second encoder 354 based on the loss value. For example, the training process can adjust the parameters of the first encoder 352 and the second encoder 354 to minimize the loss value computed using the loss function so as to minimize the distance between the pairs of first encoder output vector and second encoder output vector that simultaneously increase the distance between the first encoder output vector and second encoder output vector of two different pairs. The training process can be iterative in nature, such that, during each iteration, the training process aims to minimize the loss value, e.g., until the loss is less than a specified threshold or until the training process has executed a specified number of iterations The training process generates a high dimensional embedding space that has similar embedding vectors to represent the textual description and the graphical elements of a GUI of a training sample of a training dataset. In some implementations, the training process implemented by the system 300 uses an Adam optimizer with a learning rate of 0.001 which can later be altered during the training process. Depending upon the specific implementation any optimization algorithm other than the Adam optimizer can be used. For example, Root Mean Squared Propagation (RMSProp), Adamax, Stochastic Gradient Descent (SGD) are optimizers that can also be used to train the machine learning model 350.

After training the machine learning model 350 and during prediction a textual description of a GUI that generally describes the GUI is provided by the user of the system. For example, if the user wants a GUI with a login page with textbox and a button, the textual description can be something similar to "login page with a textbox and a buttons."

The system 300 then preprocesses the textual description so as to convert textual description into a format using techniques that were used during the training process of the machine learning model. This allows the textual description to be converted into a format that the machine learning model can process and has been trained on. The preprocessing can also include other techniques such as correction of spelling errors, using conventional automated, computer-based algorithms and are generally identical to the preprocessing step performed while training the machine learning model 350. In this example, the system 300 uses a pre-trained BERT model 130 such as a BERT_base with 12 layers of transformers blocks and a hidden size of 768 to generate an embedding vectors for each word in a sentence and a special classification (CLS) token that can be further used to generate fixed length vectors for the entire textual description. For example, if the textual description for the anticipated GUI includes k words, the system 300 will generate k fixed length vectors. According to the current example, the system 300 can use the BERT model 130 to generate k fixed length vectors where each vector is a real valued vector that includes 768 dimensions.

After generating the embedding vectors, the embedding vectors are provided as input to the first encoder 352 of the machine learning model 350. The first encoder 352 processes the embedding vectors of the textual description to generate a predicted first encoder output vector. To identify one or more GUIs that closely resembles the textual description, the system 300 can identify a GUI from the training dataset that has the least distance from the generated predicted first encoder output vector. For this the system 300 can compute second encoder output vectors for the GUIs of the training dataset and compare the similarity between the predicted first encoder output vector and second encoder output vectors.

In some implementations, the similarity between the predicted first encoder output vector and second encoder output vectors can be computed using dot-product. In some implementations, the system 300 can use the second encoder 354 generate and store the second encoder output vectors for the GUIs of the entire training dataset before the prediction phase. The system 300 can store the generated second encoder output vectors in a database or any data structure as deemed necessary by the user of the system 300. In such implementation, during prediction the system 300 can perform a lookup operation into the stored second encoder output vectors to select and compute the dot-product. In another implementation, the system 300 can iterate through each of the GUIs in the training dataset to generate the second ender output vector and simultaneously compute the dot-product between the predicted first encoder output vector and the generated second encoder output vector. The system 300 can continue iterating over the training samples of the training dataset until the system 300 identifies a GUI that generates a second encoder output vector which has a dot-product value that is less than a pre-specified threshold. In some implementation, the system 300 can compute dot-product of the second encoder output vectors of each of the GUIs in the training dataset and select the GUI that has the minimum value for the dot-product. After selecting the GUI, the GUI is presented to the user as the GUI that is described by the textual description.

Figure 4:
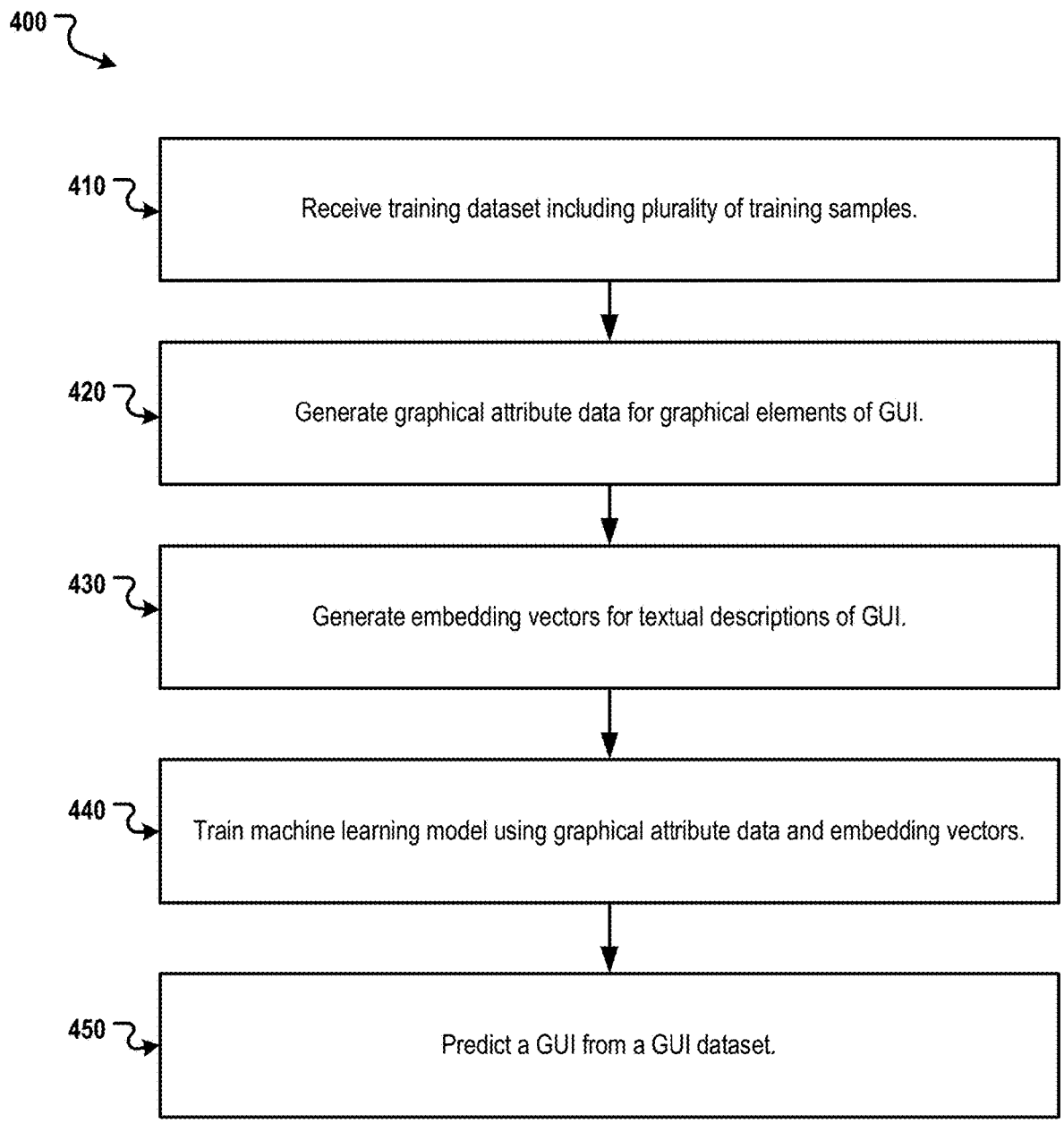
FIG. 4 is a flow diagram of example process of training and using a machine learning model to generate a GUI using the implementation depicted in FIG. 3.

FIG. 4 is a flow diagram that illustrates an example process 400 of implementing the machine learning model 350 depicted in FIG. 3. Operations of the process 400 can be implemented, for example, by the components of the system 300, which are implemented in one or more computers or data processing apparatus. Operations of the process 400 can also be implemented as instructions stored on one or more computer readable media which may be non-transitory, and execution of the instructions by one or more data processing apparatus can cause the one or more data processing apparatus to perform the operations of the process 400.

The process 400 receives a training dataset including plurality of training samples (410). For example, training a machine learning model 350 to generate a GUI requires a training dataset that includes multiple training samples where each training sample includes an image of a GUI and a corresponding natural language textual description that describes the GUI. For example, if a training sample depicts a login screen with graphical elements such as two textboxes and a submit button where the first textbox is for providing username and the second textbox is for providing password, the textual description can include "a login screen" or "a login screen with two textboxes and a button". Each training sample can also include a structural representation of the graphical elements of the sample GUI. For example, each training sample can also include a JSON file where each node corresponding to a graphical element contains various properties of the graphical element such as class, visibility to the user and the bounds of the element. The training dataset can be obtained as screen shots from a plurality of user devices such as smartphones, personal computers and tablets. The screen shot can be taken from devices that show GUIs of different application and digital content. The screen shots can then be analyzed by human evaluators who review the screenshot and provide a textual description of the GUI.

The process 400 generates graphical attribute data for graphical elements of GUI (420). Prior to training the machine learning model 350, the system 300 preprocesses the training dataset so as to convert the graphical elements of a GUI in a training sample into a format so that the machine learning model 350 can understand and process the graphical elements of the GUI. For example, the system 300 can pre-process the GUI images and the corresponding view hierarchy (if available) of the training dataset so as to represent the different graphical elements that make up the GUI. To represent the graphical elements coherently, the system 300 can generate graphical attribute data by parameterizing each graphical element using the a tuple $u_i=[x_i, y_i, w_i, h_i, e^c]$ where i is the element identifier, $x_i$ and $y_i$ are the x-y co-ordinates of the i-th element with respect to the GUI, $w_i$ and $h_i$ are the width and height of the i-th element and $e^c$ is the label identifying the class of i-th graphical element. In some implementations, $e^c$ can be a one-hot vector identifying the class of the graphical element. For example, if the entire training dataset includes 6 unique graphical element types, then for each graphical element, $e^c$ will be a six dimensional binary vector where each distinct element type stands for one dimension of the binary vector such that the binary value of a respective graphical element is 1 for the respective dimension and 0 otherwise.

When the GUI includes multiple graphical elements, the system 300 can generate graphical attribute data that includes multiple tuples sorted based on the values of the tuples. For example, assume that a GUI includes a button and a textbox. The system 300 can generate graphical attribute data that includes a first tuple for the button and a second tuple for the textbox. The system 300 can use the two tuples for training the machine learning model 350 in a sorted order based on the value of the y-coordinate of the two tuples. If the two graphical elements have the same y-coordinate, the system 300 can use the value of x-coordinate to sort the tuples. For example, FIG. 3 shows a training sample of a GUI 105 from the training dataset. The GUI 105 includes four graphical elements 105-1 to 105-4. Each of these four graphical elements is represented using a tuple. For example, 107 represents the graphical attribute data of the GUI which includes four graphical elements 107-1 to 107-4 ordered according to their corresponding y-coordinates.

The system 300 can select only a subset of graphical elements from a training sample that can include multiple graphical elements. For example, if the number of graphical elements exceeds a pre-specified threshold, the system 300 can select a subset of graphical elements from the GUI to be represented in the graphical attribute data. In other implementations, if the GUI has an unknown graphical element, the system 300 can filter the unknown graphical element from the graphical attribute data. In another implementation, if the system 300 filters and/or removes a particular graphical element from the graphical attribute data, the system 300 can also remove other graphical elements that may be directly related to the particular graphical element. For example, if the system 300 removes a particular graphical element, the system 300 can also remove graphical elements that are structurally or contextually dependent on the particular graphical element.

The process 400 generates embedding vectors for textual descriptions of GUI (430). For example, the textual description of the GUIs of the training dataset is pre-processed and transformed into vectors of real numbers using one of the many embedding techniques. For example, the system 300 can identify a plurality of words, individual characters and multi word sequences in the textual description. To make a machine learning model 350 understand and process the natural language textual description, free-text words and phrases of the textual description can be transformed into numeric values. For example, the system 300 can use one-hot encoding to generate a binary vector for each distinct word of the textual description such that each distinct word stands for one dimension of the binary vector and a binary value of the respective word indicates a (1) for the word and (0) otherwise.

In another example, the system 300 can use word embeddings to represent words and phrases of the textual description in vectors of (non-binary) numeric values with much lower and thus denser dimensions by exploiting the similarity and hidden semantic relationships between words. To generate a vector, the system 300 can train using encoding algorithms such as skip-gram model or continuous-bag-of-words (CBOW) models on a text corpus to generate an embedding matrix that includes a list of all words and their corresponding embeddings based on the vocabulary of the text corpus. After generating an embedding matrix, the system 300 can perform a look-up operation on the embedding matrix to select an embedding vector for a particular word in the textual description.

In another example, the system 300 can also use bidirectional encoder representations from transformers (BERT) to extract features, namely word and sentence from the textual description of the GUIs. For example, the system 300 can use a pre-trained BERT model 130 such as a BERT_base with 12 layers of transformers blocks and a hidden size of 768 to generate an embedding vectors for each word in a sentence and a special classification (CLS) token that can be further used to generate fixed length vectors for the entire sentence. Using such techniques the system 300 can generate fixed length vectors for each word in the textual description of each training sample in the training dataset. If the textual description for a particular GUI includes k words, the system 300 will generate k fixed length vectors.

The process 400 trains a machine learning model using graphical attribute data and embedding vectors (440). For example, the machine learning model 350 is trained by adjusting a plurality of training parameters of the first encoder 352 and the second encoder 354 using a training process implemented by the system 300. The training process for the machine learning model 350 is an iterative process that samples a training sample from the training dataset. After sampling, the training process generates the graphical attribute data for the GUI of the training sample and also generates the embedding vectors to represent the textual description of the GUI in the training sample. After generating the graphical attribute data and the embedding vectors, the training process uses the first encoder 352 and the second encoder 354 to generate a pair of first encoder output vector and a second encoder output vector. The training process then uses the first encoder output vector and the second encoder output vector to adjust the training parameters of the first encoder 352 and the second encoder 354. The following is an example of iteration of the training process.

The training process of the machine learning model 350 can use batch processing to generate multiple pairs of first encoder output vector and a second encoder output vector. For example, during each iteration, the training process can select K training samples from the training dataset and for each of the K training samples, provide the corresponding embedding vectors of the textual descriptions as input to the first encoder 352 and the corresponding graphical attribute data to the second encoder 354. By doing so, the training process can generate K pairs of first encoder output vector and second encoder output vector. The selection process of the K training samples can be based on the cross validation techniques implemented by the system 300. For example, the system 300 can train the machine learning model 350 using K-fold cross validation, stratified K-fold cross validation etc.

The training process computes a loss value based on the K pairs of first encoder output vector and second encoder output vector that indicates the distance between the first encoder output vector and second encoder output vector. In some implementations, the loss value can also represent the distance between the first encoder output vector and second encoder output vector of each of the K pairs. The loss value can be computed using a loss function that can be represented as $$L(FirstEncoder, SecondEncoder) = -\frac{1}{k}\sum_{i=1}^{K} S(l_i, r_i) - \log\sum_{j=1, j\neq i}^{K} \exp(S(l_i, r_j)) - \frac{1}{k}\sum_{i=1}^{K} S(r_i, l_i) - \log\sum_{j=1, j\neq i}^{K} \exp(S(l_i, r_j))$$

where $S(l_i, r_i)$ is the dot-product of the i-th first encoder output vector and second encoder output vector.

The training process adjusts the values of the training parameters of the first encoder 352 and the second encoder 354 based on the loss value. For example, the training process can adjust the parameters of the first encoder 352 and the second encoder 354 to minimize the loss value computed using the loss function so as to minimize the distance between the pairs of first encoder output vector and second encoder output vector that simultaneously increase the distance between the first encoder output vector and second encoder output vector of two different pairs. The training process can be iterative in nature, such that, during each iteration, the training process aims to minimize the loss value, e.g., until the loss is less than a specified threshold or until the training process has executed a specified number of iterations The process 400 predicts a GUI from the GUI dataset (450). For example, after training the machine learning model 350, a textual description of a GUI that generally describes the GUI is provided by the user of the system. For example, if the user wants a GUI with a login page with textbox and a button, the textual description can be something similar to "login page with a textbox and a buttons."

The system 300 then preprocesses the textual description so as to convert textual description into a format using techniques that were used during the training process of the machine learning model. This allows the textual description to be converted into a format that the machine learning model can process and has been trained on. The preprocessing can also include other techniques such as correction of spelling errors, using conventional automated, computer-based algorithms and are generally identical to the preprocessing step performed while training the machine learning model 350. In this example, the system 300 uses a pre-trained BERT model 130 such as a BERT_base with 12 layers of transformers blocks and a hidden size of 768 to generate an embedding vectors for each word in a sentence and a special classification (CLS) token that can be further used to generate fixed length vectors for the entire textual description. For example, if the textual description for the anticipated GUI includes k words, the system 300 will generate k fixed length vectors. According to the current example, the system 300 can use the BERT model 130 to generate k fixed length vectors where each vector is a real valued vector that includes 768 dimensions.

After generating the embedding vectors, the embedding vectors are provided as input to the first encoder 352 of the machine learning model 350. The first encoder 352 processes the embedding vectors of the textual description to generate a predicted first encoder output vector. To predict a GUI based on the textual description, the system 300 can identify a GUI from a GUI dataset that has the least distance from the generated predicted first encoder output vector. The GUI dataset may be the training dataset, or a set of data from other GUIs, or a combination of both. For this the system 300 can use the second encoder 354 to compute a second encoder output vectors for the GUIs of the GUI dataset and compare the similarity between the predicted first encoder output vector and second encoder output vectors.

The similarity between the predicted first encoder output vector and second encoder output vectors can be computed using dot-product. In some implementations, the system 300 can use the second encoder 354 generate and store the second encoder output vectors for the GUIs of the entire GUI dataset before the prediction phase. The system 300 can store the generated second encoder output vectors in a database or any data structure as deemed necessary by the user of the system 300. In such implementation, during prediction the system 300 can perform a lookup operation into the stored second encoder output vectors to select and compute the dot-product. In another implementations, the system 300 can iterate through each of the GUIs in the GUI dataset to generate the second ender output vector and compute the dot-product between the predicted first encoder output vector and the generated second encoder output vector. The system 300 can continue iterating over the GUIs in the dataset until the system 300 identifies a GUI that generates a second encoder output vector which has a dot-product value that is less than a pre-specified threshold. In some implementation, the system 300 can compute dot-product of the second encoder output vectors of each of the GUIs in the GUI dataset and select the GUI that has the minimum value for the dot-product. After selecting the GUI, the selected GUI is presented to the user as the GUI that is described by the textual description.

Figure 5:
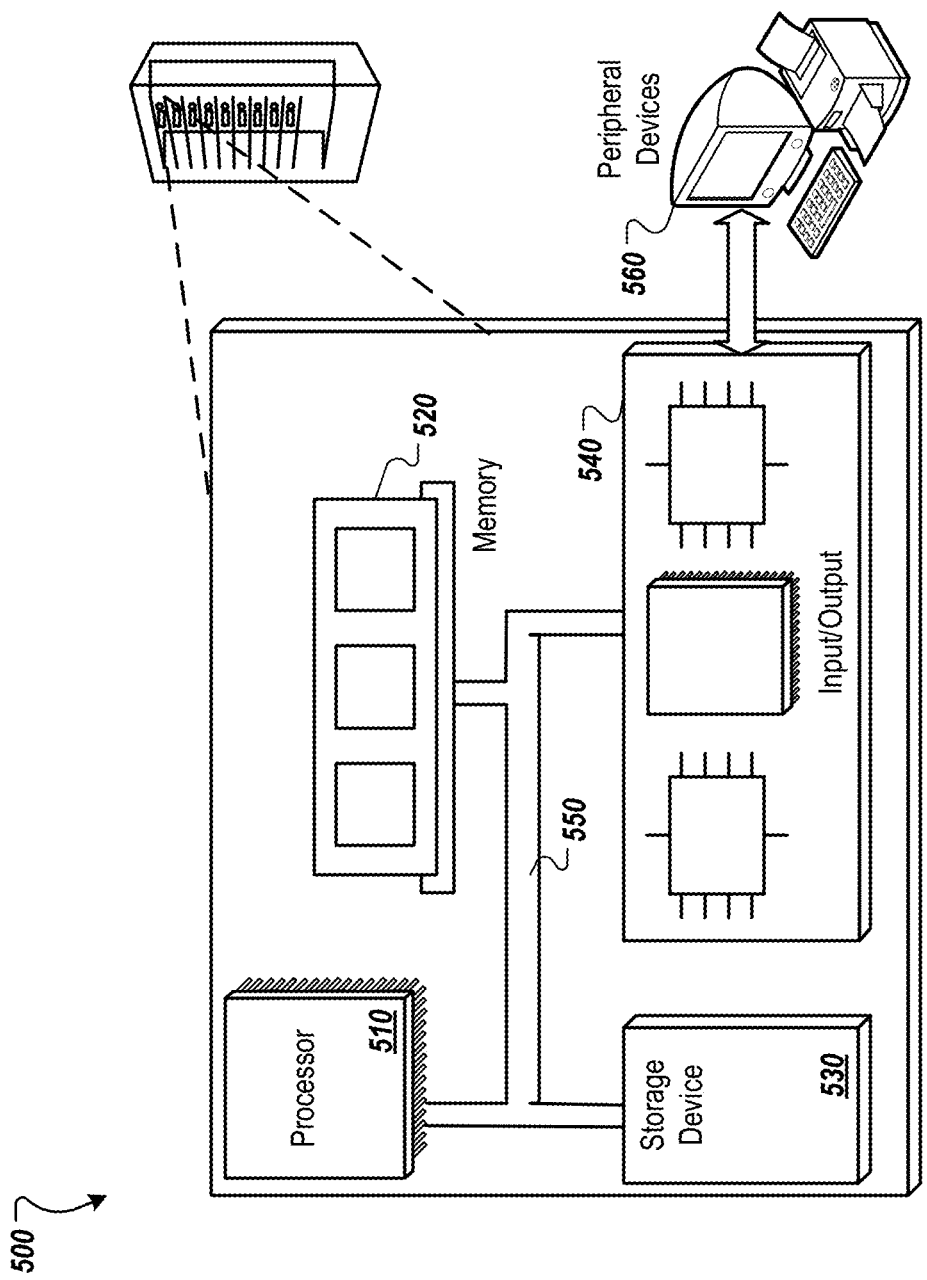
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to peripheral devices 560, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method of predicting a graphical user interface, comprising:
generating, for a natural language textual description, using a pre-trained word embedding model, an encoded representation of the natural language textual description;
providing the encoded representation of the natural language textual description to machine learned model that is configured to receive as input, the encoded representation and generate as output, a first embedding vector;
determining second embedding vectors, each second embedding vector determined from graphical attribute data describing a corresponding user interface image in a training dataset;
selecting one of the corresponding user interface images based on the first embedding vector and the second embedding vectors; and
providing the selected corresponding user interface images as output in response to the natural language text description;
wherein the machine learned model comprises a first encoder and a second encoder trained on a training dataset comprising a plurality of training samples, and wherein:
each training sample including:
a user interface image that includes a plurality of graphical elements; and
a natural language textual description of the user interface image;
the first encoder receives, as input, the encoded representation of the natural language textual description and generates, as output, the first embedding vector; and
the second encoder receives, as input, the graphical attribute data and generates, as output, the second embedding vector.

2. The computer-implemented method of claim 1, wherein determining second embedding vectors comprises accessing a data store storing second embedding vectors, where each second embedding vector is a generated by a second encoder model that generates the embedding vector from graphical attribute data describing a corresponding user interface image.

3. The computer-implemented method of claim 1, wherein selecting one of the corresponding user interface images based on the first embedding vector and the second embedding vectors comprises generating a dot product of each second embedding vector and the first embedding vector.

4. The computer-implemented method of claim 1, wherein the graphical attribute data that describes a corresponding user interface image is graphical attribute data that, for each graphical element of the user interface image, describes an attribute type of the graphical element, and a position of the graphical element.

5. A computer storage medium encoded with a computer program, the program comprising instructions that when executed by data processing apparatus cause the data processing apparatus to perform the operations of:
generating, for a natural language textual description, using a pre-trained word embedding model, an encoded representation of the natural language textual description;
providing the encoded representation of the natural language textual description to machine learned model that is configured to receive as input, the encoded representation and generate as output, a first embedding vector;
determining second embedding vectors, each second embedding vector determined from graphical attribute data describing a corresponding user interface image in a training dataset;
selecting one of the corresponding user interface images based on the first embedding vector and the second embedding vectors; and
providing the selected corresponding user interface images as output in response to the natural language text description;
wherein the machine learned model comprises a first encoder and a second encoder trained on a training dataset comprising a plurality of training samples, and wherein:
each training sample including:
a user interface image that includes a plurality of graphical elements; and
a natural language textual description of the user interface image;
the first encoder receives, as input, the encoded representation of the natural language textual description and generates, as output, the first embedding vector; and
the second encoder receives, as input, the graphical attribute data and generates, as output, the second embedding vector.

6. The computer storage medium of claim 5, wherein determining second embedding vectors comprises accesses a data store storing second embedding vectors, where each second embedding vector is a generated by a second encoder model that generates the embedding vector from graphical attribute data describing a corresponding user interface image.

7. The computer storage medium of claim 5, wherein selecting one of the corresponding user interface images based on the first embedding vector and the second embedding vectors comprises generating a dot product of each second embedding vector and the first embedding vector.

8. The computer storage medium of claim 5, wherein the graphical attribute data that describes a corresponding user interface image is graphical attribute data that, for each graphical element of the graphical user interface image, describes an attribute type of the graphical element, and a position of the graphical element.

9. A system, comprising:
a data processing apparatus; and
a computer storage medium encoded with a computer program, the program comprising instructions that when executed by the data processing apparatus cause the data processing apparatus to perform the operations of:
generating, for a natural language textual description, using a pre-trained word embedding model, an encoded representation of the natural language textual description;
providing the encoded representation of the natural language textual description to machine learned model that is configured to receive as input, the encoded representation and generate as output, a first embedding vector;
determining second embedding vectors, each second embedding vector determined from graphical attribute data describing a corresponding user interface image in a training dataset;
selecting one of the corresponding user interface images based on the first embedding vector and the second embedding vectors; and
providing the selected corresponding user interface images as output in response to the natural language text description;
wherein the machine learned model comprises a first encoder and a second encoder trained on a training dataset comprising a plurality of training samples, and wherein:
each training sample including:
a user interface image that includes a plurality of graphical elements; and
a natural language textual description of the user interface image;
the first encoder receives, as input, the encoded representation of the natural language textual description and generates, as output, the first embedding vector; and
the second encoder receives, as input, the graphical attribute data and generates, as output, the second embedding vector.

10. The system of claim 9, wherein determining second embedding vectors comprises accesses a data store storing second embedding vectors, where each second embedding vector is a generated by a second encoder model that generates the embedding vector from graphical attribute data describing a corresponding user interface image.

11. The system of claim 9, wherein selecting one of the corresponding user interface images based on the first embedding vector and the second embedding vectors comprises generating a dot product of each second embedding vector and the first embedding vector.

12. The system of claim 9, wherein the graphical attribute data that describes a corresponding user interface image is graphical attribute data that, for each graphical element of the graphical user interface image, describes an attribute type of the graphical element, and a position of the graphical element.

* * * * *